(12) United States Patent
Strack et al.

(10) Patent No.: US 11,927,245 B2
(45) Date of Patent: Mar. 12, 2024

(54) ENERGY CHAIN COMPRISING ROLLERS

(71) Applicant: igus GmbH, Cologne (DE)

(72) Inventors: Stefan Strack, Koenigswinter (DE); Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 1030 days.

(21) Appl. No.: 16/648,277

(22) PCT Filed: Sep. 17, 2018

(86) PCT No.: PCT/EP2018/075036
§ 371 (c)(1),
(2) Date: Mar. 18, 2020

(87) PCT Pub. No.: WO2019/053248
PCT Pub. Date: Mar. 21, 2019

(65) Prior Publication Data
US 2021/0364063 A1    Nov. 25, 2021

(30) Foreign Application Priority Data
Sep. 18, 2017    (DE) ...................... 20 2017 105 644.9

(51) Int. Cl.
*F16G 13/16* (2006.01)
*F16G 13/00* (2006.01)
(Continued)

(52) U.S. Cl.
CPC ............. *F16G 13/16* (2013.01); *F16G 13/00* (2013.01); *F16G 13/07* (2013.01); *F16G 15/12* (2013.01); *H02G 3/0475* (2013.01)

(58) Field of Classification Search
CPC .......... F16G 13/16; F16G 13/00; F16G 13/07; F16G 13/06; F16G 15/12; H02G 3/0475;
(Continued)

(56) References Cited

U.S. PATENT DOCUMENTS 3,948,041 A * 4/1976 Borjesson ............... F16G 13/16
59/78.1
3,997,412 A    12/1976 Ikegaya
(Continued)

FOREIGN PATENT DOCUMENTS

AT           81770      11/1920
CN       100371233 C  *  2/2008
(Continued)

OTHER PUBLICATIONS

English translate (DE102010035352A1), retrieved date Jun. 20, 2023.*
(Continued)

*Primary Examiner* — Matthew Katcoff
*Assistant Examiner* — Mohammed S. Alawadi
(74) *Attorney, Agent, or Firm* — Grossman, Tucker, Perreault & Pfleger, PLLC

(57) ABSTRACT

An energy chain comprising rollers on a number of chain links of the upper strand and/or of the lower strand. The rollers project, at least to a slight extent, beyond narrow sides of the lateral plates in the direction of the respectively opposite strand, in order to allow for rolling action when the energy chain is displaced. The invention provides for the rollers to comprise a wheel body made of plastic and having a hub, a rim and a radial region, which connects the hub and rim. The material thickness of the radial region is reduced in comparison with the rim such that radial impacts during the course of the rolling action can be damped by elastic deformability of the radial region of the roller itself. This significantly reduces the development of noise and vibration caused by rollers located opposite one another coming into contact with one another. The invention also proposes a roller subassembly and/or a chain link made up of two opposite lateral plates with corresponding rollers and, as a
(Continued)

further aspect, a special way of fastening the rollers on successive lateral plates.

30 Claims, 4 Drawing Sheets

(51) Int. Cl.
  *F16G 13/07* (2006.01)
  *F16G 15/12* (2006.01)
  *H02G 3/04* (2006.01)
  *H02G 11/00* (2006.01)

(58) Field of Classification Search
  CPC ....... H02G 11/00; F16C 13/006; F16C 13/02; F16C 13/022; F16C 2361/91
  USPC ........................... 59/78.1; 492/16, 57, 59, 60
  See application file for complete search history.

(56) References Cited

U.S. PATENT DOCUMENTS

| | | | |
|---|---|---|---|
| 5,711,733 | A | 1/1998 | Blase |
| 6,425,238 | B1 | 7/2002 | Blase |
| 7,497,072 | B2 | 3/2009 | Hermey |
| 7,591,128 | B2 | 9/2009 | Komiya |
| 9,163,699 | B2 | 10/2015 | Jaeker |
| 9,188,194 | B2 | 11/2015 | Hermey |
| 2015/0089917 | A1* | 4/2015 | Jaeker .................. H02G 11/006 59/78.1 |
| 2015/0128556 | A1* | 5/2015 | Hermey .................. F16G 13/16 59/78.1 |
| 2017/0320757 | A1 | 11/2017 | Romer |

FOREIGN PATENT DOCUMENTS

| | | | |
|---|---|---|---|
| DE | 19851340 | 3/2000 | |
| DE | 102004038817 | 3/2005 | |
| DE | 102005041689 | 3/2007 | |
| DE | 202007012593 | 12/2007 | |
| DE | 102010035352 | 3/2012 | |
| DE | 102010035352 A1 * | 3/2012 | ............ F16G 13/16 |
| DE | 202012003908 | 7/2012 | |
| EP | 1076784 | 10/2003 | |
| EP | 1359343 | 11/2003 | |
| EP | 1980301 | 10/2008 | |
| EP | 2549144 | 1/2013 | |
| EP | 3015143 | 5/2016 | |
| EP | 2839183 | 3/2017 | |
| JP | 2006-306245 | 11/2006 | |
| JP | 2008-275114 | 11/2008 | |
| JP | 2009-534593 | 9/2009 | |
| JP | 2012-086579 | 5/2012 | |
| WO | 95/04231 | 2/1995 | |
| WO | 2017/086134 | 5/2017 | |

OTHER PUBLICATIONS

English translate (CN100371233C), retrieved date Jun. 20, 2023.*
Roller Kit, retrieved date Jun. 20, 2023. https://www.amazon.com/CE-Smith-Trailer-29320-Ribbed/dp/B01MS86KEC.*
Office Action from related Indian Appln. No. 202037016080, dated Mar. 9, 2022.
Hearing Notice from related Indian Appln. No. 202037016080, dated Mar. 14, 2023.
English translation of Office Action from related Japanese Appln. No. 2020-515711, dated Apr. 25, 2023.
International Search Report from corresponding PCT Appln. No. PCT/EP2018/075036, dated Jan. 4, 2019.
International Preliminary Report on Patentability from corresponding PCT Appln. No. PCT/EP2018/075036, dated Jan. 7, 2020.

* cited by examiner

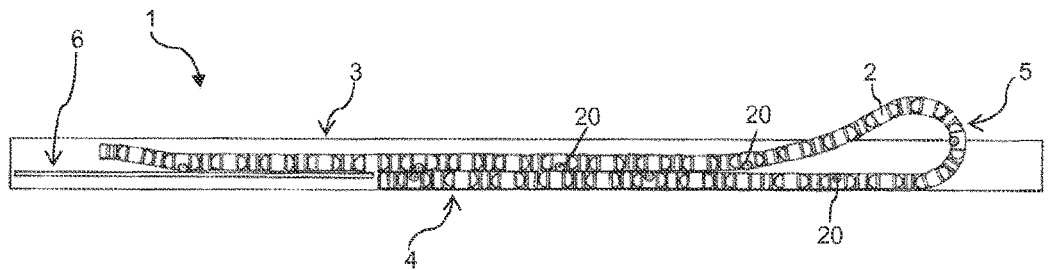
FIG. 1
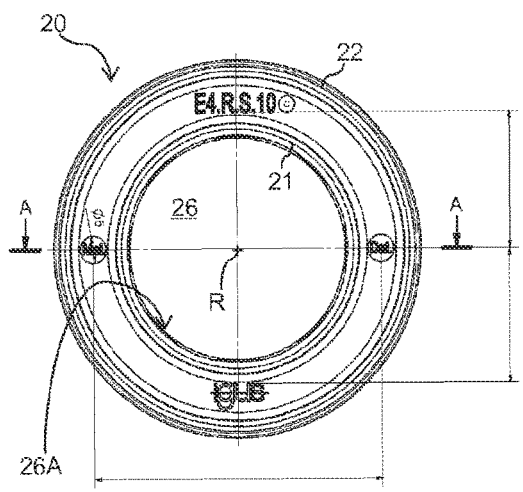
FIG. 2A
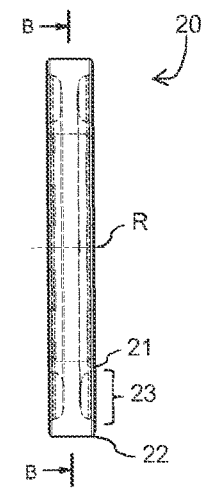
FIG. 2D
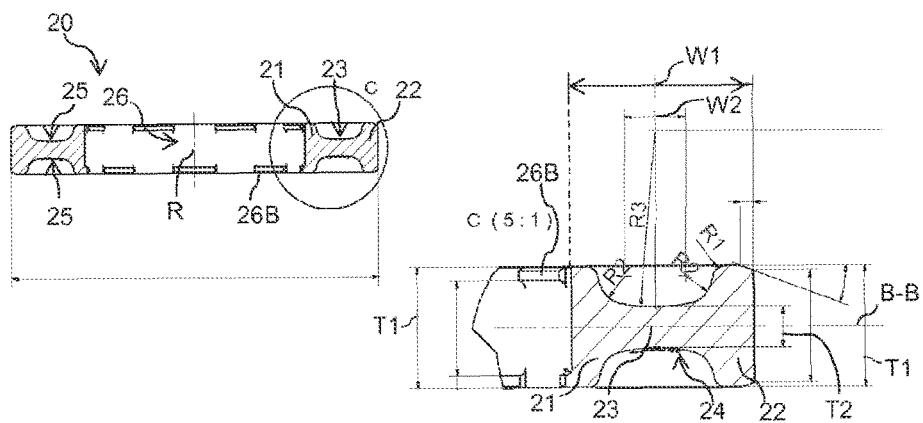
FIG. 2B
FIG. 2C

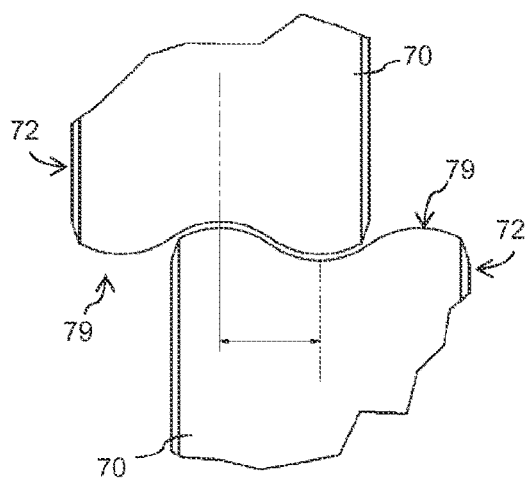
FIG.7
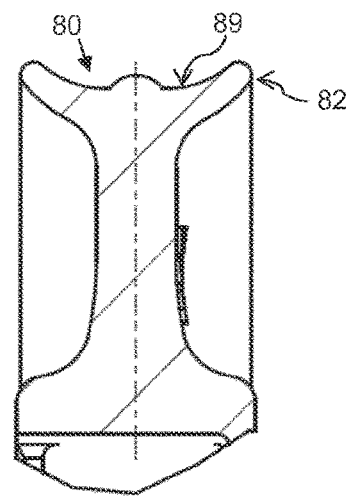
FIG.8
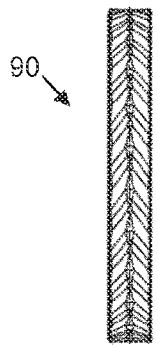
FIG. 9A
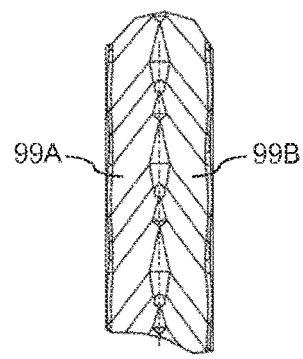
FIG. 9B
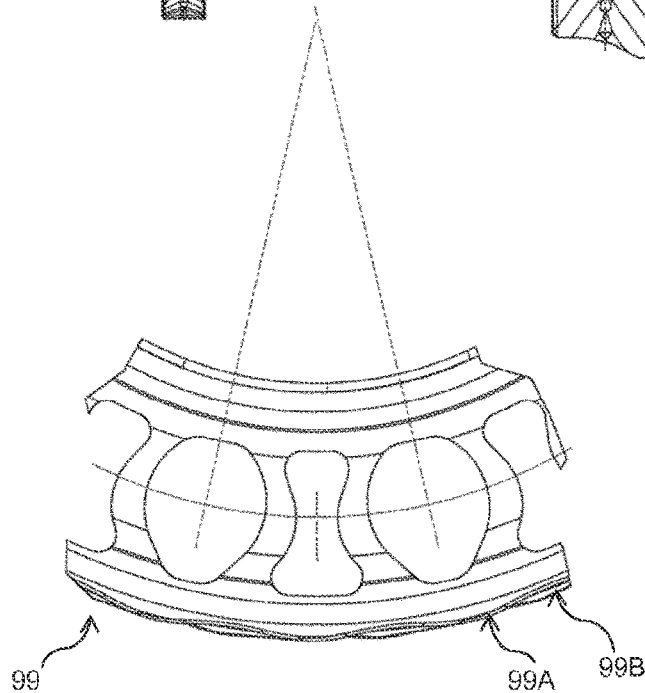
FIG. 9C
FIG.9

ENERGY CHAIN COMPRISING ROLLERS

FIELD

The invention relates generally to an energy chain comprising rollers. Energy chains are used for the active or dynamic guiding of lines, such as hoses, cables or similar, and typically have a number of chain links connected flexibly to one another and made of individual components, mostly lateral link plates parallel to one another and cross webs connecting these. An energy chain is displaceable such that it forms an upper strand, a lower strand and a deflection area connecting these with a predetermined radius of curvature.

In particular, the invention relates to an energy chain in which on at least some chain links of the upper strand or the lower strand, or of both, rollers are provided and arranged so that they project at least slightly beyond narrow sides of the lateral link plates in the direction of the respectively opposite strand. The friction when the energy chain is displaced can thus be reduced compared with sliding chains by a rolling action when the upper strand moves back and forth supported on the lower strand itself or on a separate layer of a support structure, such as e.g. a guide trough.

BACKGROUND

WO 2017/086134 A1 discloses an energy chain with guide rollers on each second chain link, which protrude transversally to the longitudinal direction of the chain and which are received in a guide groove of a guide rail. The rollers are used to guide the chain.

Generic energy chains of this kind with rollers (so-called roller chains) are already known. A well proven construction according to patents EP 1 076 784 B1 and EP 1 359 343 B1 of the applicant is shown schematically in FIG. 1. A further roller chain, in which the rollers slightly protrude from narrow sides of the lateral link plates, is disclosed in DE 20 2012 003 908 U1.

A known problem here is the development of vibration and noise, generally when the rollers encounter edges or obstacles due to the design. This is the case in particular, for example, when rollers on the upper strand encounter corresponding rollers on the lower strand. Overcoming such obstacles also increases the tensile force required and the wear, especially of the rollers themselves.

To avoid impacts between opposite rollers and the accompanying development of noise and vibration, it was proposed e.g. in EP 1 076 784 B1 that the rollers have a guide profile that is formed by circumferential guide grooves arranged spaced from one another in the running surface of the rollers.

This enables the slide rolls of two chain links running over one another and each fitted with rollers to encounter one another, run past one another substantially without contact due to a slight lateral offset or "mesh with one another". With the lateral offset, however, the complexity in the construction of the energy chain increases overall.

A much more elaborate alternative design solution by comparison with this, with rollers retracting and extending laterally, according to DE 10 2004 038 817 A1 and U.S. Pat. No. 6,997,412 B2 has evidently not been able to establish itself on the market.

Technically complex and therefore maintenance-intensive and fault-prone solutions with vertically retracting and extending rollers, i.e. rollers which can be retracted relative to the narrow side, are likewise known.

To avoid rollers encountering one another, DE 10 2010 035 352 A1 proposes that the roller is supported displaceably on or in a lateral link plate and is adjusted in a vertical direction by gravity. If the chain link with the roller is located in the lower strand, the roller does not project beyond the narrow side of the link plate. Only when the chain link plate is in the upper strand does the roller project beyond the narrow side of the link plate in the direction of the lower strand.

EP 2 549 144 A1 proposes a solution with a spring-loaded adjusting mechanism. The support wheels or rollers can be retracted by an adjusting spring into a position inside the chain link body when the rollers are located in the upper strand. When the rollers are located in the lower strand, they are moved into a position projecting beyond the narrow side against the spring loading in order to carry the opposite upper strand. The adjusting device here displaces the roller by an actuator, which protrudes on the opposite narrow side and is pressed in by the weight force in the lower strand in order to allow the rollers to protrude on the other side.

SUMMARY

A first object of the present invention, therefore, is to create an energy chain in which the rolling upper strand is movable with the minimum noise and vibration development and with low wear, wherein the design should be further simplified compared with the aforesaid prior art.

According to an independent second aspect of the invention, a further development of the roller chain known from patent EP 2 839 183 B1 is to be proposed. This is an energy chain for alternating inner link plates and outer link plates in the link plate strands, such as known e.g. from WO 95/04231 A1, wherein at least the upper strand or the lower strand comprise a number of rollers, in order to facilitate a rolling action in the displacement of the energy chain.

An independent second object of the present invention is to develop an energy chain according to EP 2 839 183 B1 further to the extent that this has an increased service life even in the event of higher tensile forces or even greater chain lengths.

First Aspect of the Invention

According to the first aspect, it is proposed according to the invention in the case of an energy chain, that at least a predominant proportion of rollers, preferably all rollers, each have a wheel body made of plastic, wherein the wheel body comprises a hub, a rim and a radial region, which connects the hub and the rim to one another in a supporting manner and the material thickness of which, in particular compared with the rim, is reduced so that radial impacts during the rolling action can be damped by elastic deformability of the radial region. Due to this design measure, the rollers themselves can be deformed elastically when a radially acting force arises, in particular when encountering an edge or an opposite roller, and thus themselves display a shock-absorbing effect.

Roller should be understood here as a roller, in particular a non-driven roller, which is used to support the self-weight of a longitudinal section of the energy chain and to reduce wear in comparison with a purely sliding progression, irrespective of an arrangement on the upper strand and/or on the lower strand. The so-called radial region in this case comprises the structural constituents of the wheel body, which are arranged radially between hub and rim and serve to transmit forces between these. The hub is arranged in the center of the roller body and serves for connection to the bearing and axle structure. The hub can be connected fixedly or detachably here to a bearing, preferably rolling bearing. Let it be noted otherwise that the term cylindrical, unless otherwise indicated, is used here in the sense of circular cylindrical.

By reducing the material thickness compared with conventional designs, the resistance of the roller to elastic deformation in the case of a radially acting compressive force is likewise correspondingly reduced. In combination with a suitable choice of plastic, adequate self-damping of the roller, which perceptibly reduces noise and vibration development and wear, can also be achieved in this way despite high durability.

In a preferred embodiment, the wheel body with hub, rim and radial region is manufactured in one piece from plastic, in particular from uniform material by means of injection molding. Suitable plastics for this are e.g. thermoplastic elastomers. Rollers with wheel bodies of thermoplastic polyurethane (TPU) as base material proved particularly durable in trials in this regard. By using a proportion of reinforcing fibers, e.g. in the range of 5-20 percent by weight, in the elastomer, in particular in a TPU matrix, the durability can be increased further without any disruptive loss of elasticity. Thus, despite similar durability as for shock-resistant rollers made of polyamide or nylon, a favorable damping effect can be achieved.

A simplification of the design results when the rim itself has an outer rolling surface for rolling on a running surface and/or the hub has a bearing receptacle coaxially with the rotary axis, i.e. preferably no separate components such as e.g. rubber tires or a hub insert are used.

To achieve the material weakening or reduced material thickness in the radial region, several possibilities exist in principle, on the one hand e.g. material weakening in an axial direction distributed over the entire circumference or on the other hand e.g. recesses or apertures in the radial region distributed over the circumference in a circumferential direction while retaining roughly the wall thickness.

In a preferred embodiment, the radial region has at least one taper axially on both sides. This can be achieved in particular by two opposite tapers symmetrical to a median plane of the wheel body. A corresponding taper at least contributes in any case to a reduction in the material thickness. The median plane is understood here to be a central longitudinal section perpendicular to the rotary axis through the wheel body. In such an embodiment the radial region can be formed in particular in the manner of a wheel disc, running substantially symmetrically to the median plane or swung in the manner of a curve about this (asymmetrically) as an example.

In embodiments with a taper in an axial direction, it can be provided that the radial region has a mean axial thickness, i.e. wall thickness measured in an axial direction, which lies in the range of 33% to 60% of the corresponding axial thickness of the rim. A minimal axial thickness in the range of 25% to 40% of the axial thickness of the rim in particular can be provided here.

To avoid unfavorable material loading it is advantageous if, as the radius increases, in particular starting out from the wheel hub, the radial region of the wheel body has an axial wall thickness continuously decreasing to a minimum, and/or bordering such a minimum a continuously increasing axial wall thickness, in particular towards the rim. In the case of this design in particular, the radial region can have two faces concavely curved according to a predetermined radius of curvature. Here the radius of curvature of the axially remote faces is preferably greater than the maximally provided axial thickness (i.e. the wall thickness in an axial direction) of the roller.

In the case of curved surfaces of the radial region in particular, a continuously curved transition can be provided from each face of the radial region to the inner surface of the rim and/or to the outer surface of the hub. Favorable loading conditions result if such a transition has a transition radius in each case that is much smaller than the radius of curvature according to which the faces are curved.

The radial region should generally represent a sufficient proportion of the radial dimension of the wheel body to develop a suitable damping effect. In long-term tests a configuration has been proven in which the radial region extends in a radial direction over a proportion of at least 25% of the wheel body. In combination with a suitably reduced material thickness, a consistently adequate deformation of the radial region for absorbing typical impact-like radial forces occurring in operation at the rim, in particular when two rollers meet, can be guaranteed by this.

With the application of the above features, the radial region can be formed, approximately in the manner of a full wheel disc, as a rotationally symmetrical ring disc that is completely contiguous or interruption-free in a circumferential direction. In other words, the reduction in material thickness can be achieved exclusively by modified wall thickness in a radial direction, wherein for every radius in a circumferential direction a predefined consistent wall thickness can be present rotationally symmetrically. Such designs have proved particularly durable in long-term tests and are regarded as a particularly preferred embodiment.

Alternatively or in addition to this, in particular to increase the damping effect, it can be provided that the radial region, roughly in the manner of a wheel rim, has axial recesses, in particular axial apertures, arranged rotationally symmetrically in a circumferential direction. Such recesses, in particular apertures, can form spoke-like radial webs in the radial region, which serve primarily to transmit force between rim and hub. Weakened or free regions between the spoke-like radial webs reduce the roller weight on the one hand and increase the deformability of the radial region on the other hand, including of the radial webs themselves. In such embodiments the wall thickness in a circumferential direction is thus variable or completely interrupted on certain radii about the rotary axis.

Full wheel discs without apertures are preferable, however.

Both ways of reducing the material thickness in the radial region can be produced relatively easily and favorably by means of injection molding, and in combination with a suitable choice of plastic permit good damping properties.

In embodiments with axial apertures in the radial region, these can have different basic forms, which should be selected so that the remaining spoke-like radial webs themselves have favorable deformation behavior. In this case the apertures can, for example:

have a crescent-shaped basic form, in order to form radial webs running curved in a bow shape with respect to the radial direction, in particular with concordant curvature; or have a convex or concave of two basic forms alternating in a circumferential direction, in order to form radial webs running curved in a bow shape with respect to the radial direction, in particular with alternately opposed curvature; or have a trapezoidal basic form, in particular corresponding to a symmetrical trapezium, with limbs running inwards or limbs running alternately inwards and outwards, in order to form radial webs running radially or obliquely to the radial axis of symmetry of the trapezium.

Irrespective of the basic form selected, the apertures are distributed or evenly distributed inside the radial region rotationally symmetrically about the rotary axis of the roller. The basic form of the apertures or recesses in the material can have in particular a main extension that extends substantially in the radial direction or at least has a predominant component in the radial direction.

The proposed design of the rollers with a deformable radial region in particular permits the rollers to be arranged in a proven manner mechanically simply on the chain links, i.e. with a rotary axis held stationary with reference to the lateral link plate, about which axis the rollers are supported rotatably on the respective lateral link plates. Complex and fault-prone adjusting mechanisms for the lateral or vertical retraction and extension of the rollers, as proposed in the prior art, are thus not required.

Irrespective of the chosen manner of material weakening in the radial region, it is provided according to another aspect or in a further development that the rolling profile with which the rim rolls on a counter-surface in cross section, i.e. in radial cross section comprising the rotary axis, forms at least one concave recess and/or at least one convex bulge. The rolling profile can thus have a progression of a double-S curve, for example, in this cross section, or a similar profile shape, which, when two rollers meet, additionally achieves a slight lateral offset or in the case of a known structural offset reduces the ramp upon meeting.

In combination with the above features or independently thereof, the rolling profile can be undulated in a circumferential direction with alternating crests and troughs. The troughs and crests here are preferably directed obliquely to the meridian plane. Furthermore, two rotationally symmetrical profile halves can preferably be provided here offset asymmetrically with respect to the meridian plane.

With suitable shaping of the rolling profile, in particular by means of injection molding, a two-dimensionally matched, rounded profile shape can be achieved, which additionally damps noises on impact, in particular when the rollers in the upper and lower strand encounter one another. It has been shown that a substantial noise factor is constituted by the possibly multiple simultaneous impacts of the rollers on one another, despite the possible provision of start-up slopes or "ramps" before and after the roller openings. In a conventional roller form with cylindrical full profiles, the rollers encounter one another in a linear manner, so to speak, which can lead to a bounce characteristic of the rolling roller—as shown by high-speed recordings in testing. Without further reducing the distance between the rolling strand and the counter-surface, in particular the opposite strand, "jumping" and thus the creation of noise and vibration can be largely reduced by a suitable profile shape.

In each of the aforesaid embodiments the roller is preferably attached by means of a receptacle in the hub in a torque-proof manner to a pivot bearing unit, in particular to a rolling bearing such as e.g. a ball bearing, in order to support the roller rotatably on a lateral link plate. The hub preferably has an attachment profile on a predominantly cylindrical inner surface, in particular with projections and/or recesses, for a force- and form-fit connection to or a torque-proof fastening on an outer surface of the pivot bearing unit.

The roller can be supported by means of a pivot bearing unit mounted on a swivel joint, which is formed by two adjacent lateral link plates and connects these flexibly to one another in a swivellable manner Here the lateral link plates preferably each have a corresponding recess in which the roller is received between overlapping side wall regions of the lateral link plates.

Thus, the roller together with the pivot bearing unit is received in a protected manner between side wall regions of the lateral link plates and only protrudes slightly outwards on the narrow side.

The roller according to the invention is suitable, however, not only for energy chains in particular in which the upper strand can roll as intended on the lower strand. In this case the running surfaces on which the rollers roll can be formed by the narrow sides of the lateral link plates facing the opposite strand. Even when rolling on another type of support structure, for example a supporting running surface of a guide trough, however, the first aspect of the invention offers the advantages cited at the beginning.

A roller according to the first aspect of the invention above can be used generally in any energy chain with rollers.

Second Aspect

According to a second aspect, which is regarded as an own invention and claimed independently, in the case of an energy chain with alternating inner and outer link plates in the opposite link plates, it is provided strictly according to the invention that each roller is arranged respectively on a pair of two outer link plates swivellable against one another, with a first and an adjacent second outer link plate, and that the flexible connection of the pair of outer link plates comprises a joint pin, which is molded in one piece with the first outer link plate, and a corresponding joint mount, which is formed by the second outer link plate, wherein the joint pin engages in the joint mount and is swivellable therein.

Compared with the flexible connection according to EP 2 839 183 B1, in which a cover screwed on separately (cf. FIG. 1c there) forms the joint pin, an increased service life can be realized according to the second aspect above in the case of high tensile forces or a greater maximal length of the energy chain.

The joint mount can be formed here in particular by the one sleeve-like annular projection, which is coaxial with the swivel axis and is manufactured in one piece with the tensile-strengthened link plate is accordingly robust. The roller can be supported in this case rotatably with its rotary axis coaxial with the swivel axis and be fitted on this annular projection. To this end the roller can be attached rotatably to the annular projection, in particular using a pivot bearing unit, in that the roller is mounted in a torque-proof manner on a first ring of the pivot bearing unit, wherein the pivot bearing unit is attached by a relatively rotatable second ring in a torque-proof manner to the outer circumference of the annular projection of the outer link plate. The latter can be achieved without the use of a screw connection, in particular by a press fit or similar.

In an advantageous further development of the second aspect, the energy chain has a consistent spacing for all chain links, wherein it is provided that the position of the swivel axis of the pair of outer link plates corresponds in a longitudinal direction to this spacing and that the swivel axis of the pair of outer link plates is further offset in height with regard to the link plate height compared with the link plate central plane in the direction of the respectively opposite strand. In other words, compared with the swivel axes of the connection to the adjoining inner link plates, the two outer link plates of the pair with roller have an offset in the direction of the link plate height, in order to facilitate an adequate transition of the roller, the rotary axis of which lies coaxially with the height-offset swivel axis.

To increase the lateral stability transversely to the longitudinal direction of the energy chain, a further development provides that the adjacent outer link plates of the pair with roller are located in a double "tongue and groove" with one another. For this it is preferably provided that one of the adjacent outer link plates of the pair has a first guide groove extending parallel to the swivel plane, that the other outer link plate of the pair engages in the guide groove with a first guide part extending parallel to the swivel plane, in particular over the entire swivel angle, that the other outer link plate of the pair has a second guide groove extending parallel to the swivel plane and that the one outer link plate of the pair engages with a second guide part extending parallel to the swivel plane in the second guide groove, in particular over the entire swivel angle. Improved lateral stability can be achieved in the assembly with rollers compared with EP 2 839 183 by the engagement of the two guide parts in both guide grooves.

To simplify the assembly and increase the engagement effect, one of the adjacent outer link plates of the pair preferably comprises a cover part to be fitted separately, which forms a lateral delimitation of the first guide groove.

Finally, the second aspect also relates to a roller assembly for an energy chain. This comprises respectively two opposite pairs of a first and a second outer link plate, which are held parallel by cross webs and are swivellable towards one another and have a roller coaxial with the swivel axis. The roller assembly is characterized in that it can be constructed from just two differently configured link plate parts, which can be used in both opposite link plate strands. The first two outer link plates and the second two outer link plates are accordingly each manufactured identically. Thus, four link plate parts in total are no longer necessary for realizing an assembly with rollers.

The pairs of complementary outer link plates according to the second aspect of the invention are configured such that they are compatible with existing, commercially obtainable designs of energy chains with alternating inner and outer link plates. In other words, the overlapping areas of the outer link plates remote from the rotary axis of the roller are compatible with known inner link plates, as already described in EP 2 839 183 B1.

For both aspects of the invention it is understood that each roller assembly has preferably precisely two rollers with coaxial or aligned rotary axes, i.e. one roller per link plate strand side in each roller assembly. The length-related number of rollers can be adapted optionally to the particular application, as the roller assemblies can be used in a modular manner and are compatible with existing energy chains.

Features of the second aspect of the invention can be combined advantageously with those of the first aspect.

BRIEF DESCRIPTION OF THE DRAWINGS

Further details, features and advantages of the invention result from the following detailed description of a preferred exemplary embodiment with reference to the enclosed figures. These show:

FIG. 1 is a schematic side view of a rolling energy chain comprising rollers;

FIGS. 2A-2D are an inventive roller according to a first aspect and first exemplary embodiment in a side view (FIG. 2A), a cross section according to section lines A-A (FIG. 2B), an enlargement of the cross section (FIG. 2C) and a longitudinal section (FIG. 2D);

FIG. 7 is interactive rolling profiles according to another exemplary embodiment in cross section;

FIG. 8 is a rolling profile according to another exemplary embodiment in cross section;

FIGS. 9A-9C are a rolling profile according to another exemplary embodiment in frontal view (FIG. 9A), in an enlargement of the frontal view (FIG. 9B) and in a partial side view (FIG. 9C)

DETAILED DESCRIPTION

Figure 3:
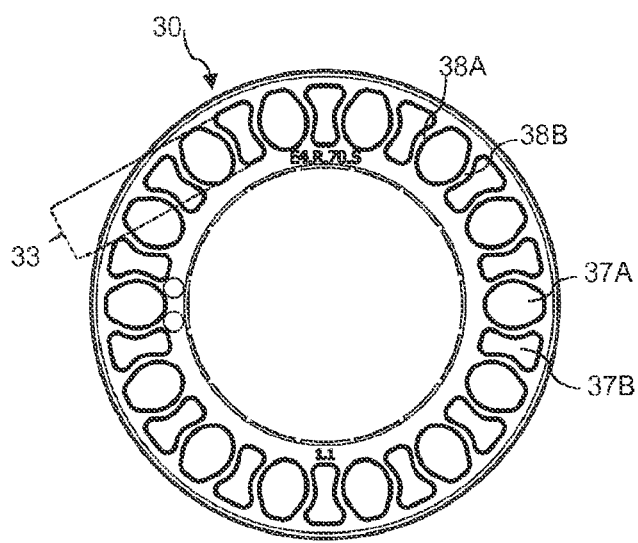
FIG. 3 is an inventive roller according to a second exemplary embodiment in a side view.

FIG. 1 shows an energy chain 1 for the guiding of lines, such as hoses, cables or similar (not shown), with a number of chain links 2 flexibly connected to one another, which each comprise lateral link plates (cf. FIG. 10A-10B) parallel to one another and cross webs (not shown) connecting these of a known design. The energy chain is displaceable back and forth and in this process variably forms an upper strand 3, a lower strand 4 and a deflection area 5 connecting these. In the example in FIG. 1, rollers 20 are provided at regular intervals on selected chain links 2 of the upper strand 3 and the lower strand 4. The rollers 20 are arranged such that they project beyond narrow sides of the lateral link plates in the direction of the respectively opposite strand 3 or 4. When the energy chain 1 is displaced, the rollers 20 thus facilitate a rolling action of the upper strand 3 on the one hand on the lower strand 4 and moreover on a separate support surface 6, e.g. on a guide trough. With the exception of the design of the rollers 20 explained in greater detail below, the energy chain 1 according to the first aspect can have any known design.

FIG. 2 shows a first exemplary embodiment of a roller 20 according to the invention. The roller 20 is manufactured from uniform material and in one piece from plastic, e.g. by means of injection molding.

In addition to a bearing unit, not shown here, such as a rolling bearing (cf. FIG. 10A-10B), the roller 20 has a wheel body made of plastic with a hub 21, a rim 22 and with a radial region 23 connecting hub and rim, wherein hub 21, rim 22 and radial region 23 are manufactured from one piece. As can best be seen from FIG. 2C, the material thickness, here in particular the axial wall thickness, of the radial region 23 is perceptibly reduced compared with the axial dimension T1 of the rim 22 and the hub 21. The wheel body of the roller 20 can thus damp radial impacts by elastic deformability of the radial region 23, i.e. the roller 20 itself has an inherent shock-absorption effect. To this end there is provided on both sides symmetrical to the median plane B-B an axial tapering 24, which causes the substantial reduction in the material thickness. The narrowings or taperings of the wall thickness of the radial region 23 are formed by a radius R3, for which R3>>T1 and R3>>W1 applies, with W1 as the radial overall dimension of the wheel body from the inner surface of the hub 21 to the outer surface of the rim 22. Opposed faces 25 of the radial region are thus curved concavely according to the radius of curvature R3.

In the radially central region the radial region 23 has a minimal wall thickness T2<<T1, with e.g. T2=25-35% of T1. The central axial thickness of the radial region 23 is thus also significantly reduced relative to the external axial dimensions. As FIG. 2C further illustrates, the axial wall thickness increases continuously from the area with the minimum T2 radially inwards and outwards. Furthermore, a continuously curved transition, corresponding to the significantly smaller transition radius R2, is provided from each face 25 of the radial region 23 to the inner surface of the rim 22 and the outer surface of the hub 21, with R2<<R3. Finally, a reverse rounding takes place according to the radius R1, which is similarly dimensioned to R2, towards the opposite faces of the hub 21 and the rim 22. The resulting avoidance of sharp-edged transitions between radial region 23 and hub 21 and rim 23 is advantageous with respect to the deformability of the radial region 23. It is advantageous, furthermore, if the radial region 23 with reduced wall thickness extends at least over a radial section W2 of at least 25% of the radial dimension W1.

In the exemplary embodiment according to FIG. 2, which is particularly preferable on account of its durability, the roller 20 is provided with an axially narrowed radial region 23, which is formed as a ring that is contiguous without interruptions in a circumferential direction and rotationally symmetrical to the rotary axis R, as the side view in FIG. 2A illustrates.

The design according to FIG. 2 can be combined, however, with axial apertures according to FIGS. 3-6 if an increased deformability or damping effect is desirable. The design of hub and rim in FIGS. 3-6 can correspond to that according to FIG. 2 and is not repeated.

FIG. 3 shows an exemplary embodiment of a roller 30 with a plurality of axial apertures 37A, 37B in the radial region 33. The apertures 37A, 37B alternating in a circumferential direction each have different basic forms, a substantially oblate oval, convex basic form for the apertures 37A and a roughly T-shaped rounded concave basic form for the apertures 37B. The conjugate basic forms of the apertures 37A, 37B are selected such that they form radial webs 38A, 38B curved in the shape of a bow in the radial region 33, which webs run symmetrically but oppositely curved with reference to a symmetry radius of the apertures 37A, 37B. The radial webs 38A, 38B act here like precurved wheel spokes, which deform elastically and thus improve damping in the event of radial forces on the outside of the rim.

Figure 4A:
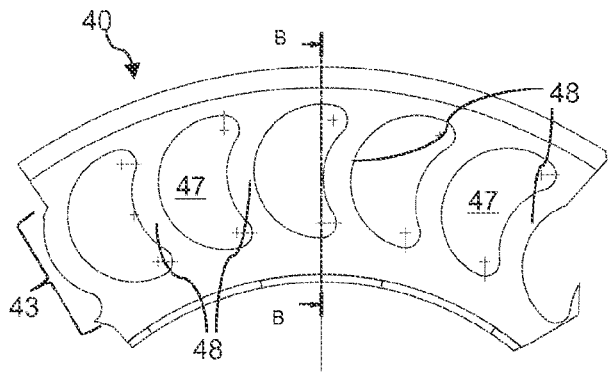
FIGS. 4A-4B are an inventive roller according to a third exemplary embodiment in partial side view (FIG. 4A) and in an enlarged cross section (FIG. 4B)
Figure 4B:
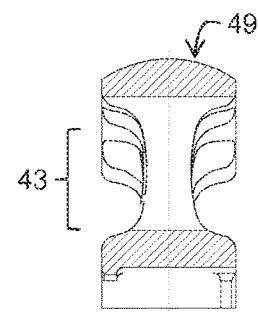

FIG. 4 shows an exemplary embodiment of a roller 30 likewise with a plurality of axial apertures 47 uniformly distributed over the circumference in the radial region 43, here e.g. a number of approx. 25-30 apertures 47. The apertures have a crescent-shaped basic form here in the median plane and in a side view and thus form radial webs 48 curved respectively concordantly with an effect similar to FIG. 3. The shaping of the apertures 47 is selected such that the radial webs 48 have a substantially consistent thickness in a circumferential direction and transition continuously into the rim and the hub at the ends. FIG. 4B illustrates the combination of the apertures 47 with the tapering of the radial region according to the principle from FIG. 2. FIG. 4B further shows a rolling surface curved convexly outwards on the rim.

Figure 5:
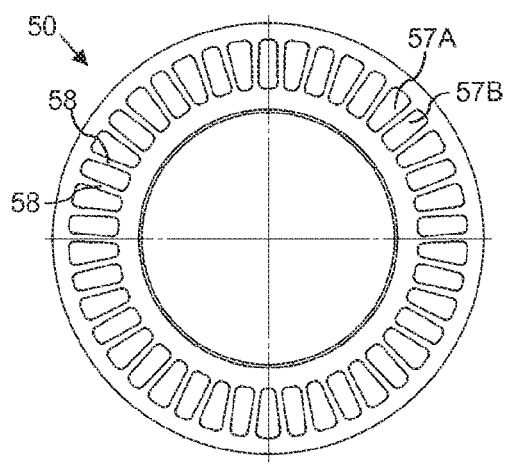
FIG. 5 is an inventive roller according to a fourth exemplary embodiment in a side view.
Figure 6:
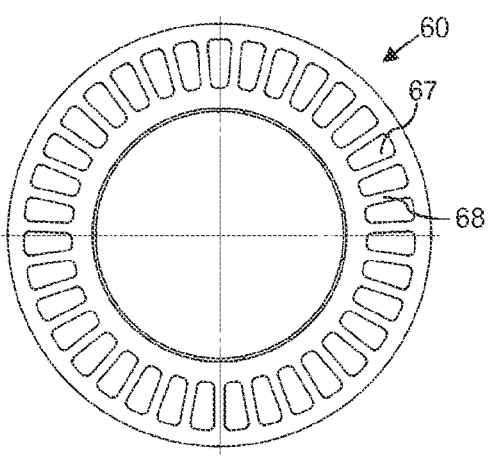
FIG. 6 is an inventive roller according to a fifth exemplary embodiment in a side view.

The variants of the rollers 50 and 60 according to FIGS. 5-6 differ likewise only due to the shape of the respective axial apertures. In FIG. 5 trapezoidal apertures 57A, 57B running alternately outwards and inwards are provided in a circumferential direction with isosceles trapeziums symmetrical to the radius as the basic form. Due to this, radial webs 58 remain that are slightly oblique to the radius and thus run towards or apart from one another outwardly when looked at in pairs. In FIG. 6 the apertures 67 each have an identical trapezoidal shape converging inwardly, so that the radial webs 68 remaining due to this run technically radially. The radial regions of the rollers 50 and 60 and their hub and rim can otherwise be configured likewise according to the principle from FIG. 2.

FIGS. 7-9 illustrate different profiles of the rolling running surfaces (rolling profile) in cross section through the rim 72, 82 and 92, wherein the configuration of the wheel body otherwise can correspond to one of the above exemplary embodiments.

In FIG. 7 the rolling profile 79 has a concave recess central to the median plane and on the outsides, symmetrical to the median plane, two convex bulges, which are formed conjugate to or matching the concave recess. By laterally offsetting 2 rollers 70 meeting one another, as shown in FIG. 7, the ramp in the spacing between the strands can be reduced or avoided entirely. The rolling profile 79 can here bring about a corresponding lateral offset autonomously.

FIG. 8 shows a rolling profile 89, the active principle of which is similar, but wherein an improved damping effect can be achieved by the two more strongly pronounced convex bulges on the end faces.

FIGS. 9A-9C show another rolling profile 99. This rolling profile 99 is undulated in a circumferential direction with alternating crests 99A and troughs 99B. In this case the crests 99A and troughs 99B are directed with their flanks at an angle oblique to the meridian plane, as FIGS. 9A-B illustrate. Moreover, the rolling profile 99 consists of two profile halves that are each rotationally symmetrical with reference to the circumferential direction, but are asymmetrically offset by half a wavelength in relation to the meridian plane, so that in an axial direction a crest 99A or a trough 99B of one profile half is opposed by a trough or crest of the other profile half (FIG. 9C). An additional damping effect is achieved by this rolling profile.

Figure 10A:
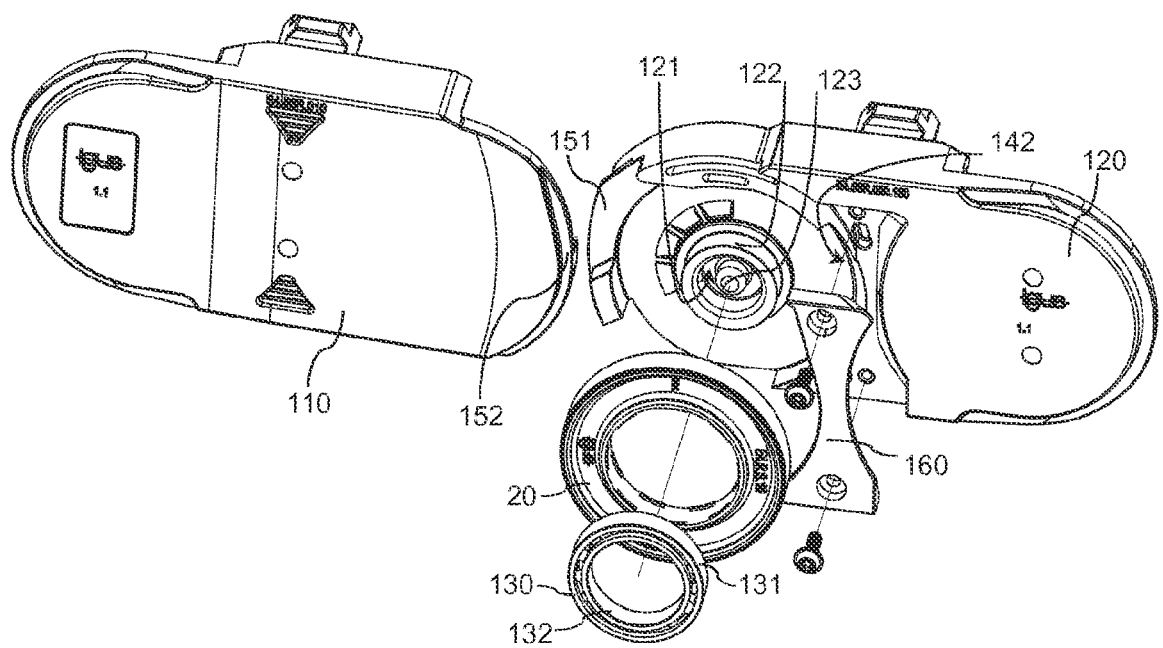
FIGS. 10A-B are views in perspective of two inventive outer link plates according to a second aspect, seen from the outside (FIG. 10A) and inside (FIG. 10B).

Returning to FIG. 2, the hub 21 of the roller 20 forms a substantially cylindrical receptacle 26 about the rotary axis R, with which the hub 21 is attached in a torque-proof manner to a pivot bearing unit (FIG. 10A). To this end the hub 21 has on an inner surface an attachment profile 26A, in particular with projections 26B and/or recesses, for a force- and form-fit connection to an outer surface of the pivot bearing unit.

Figure 10B:
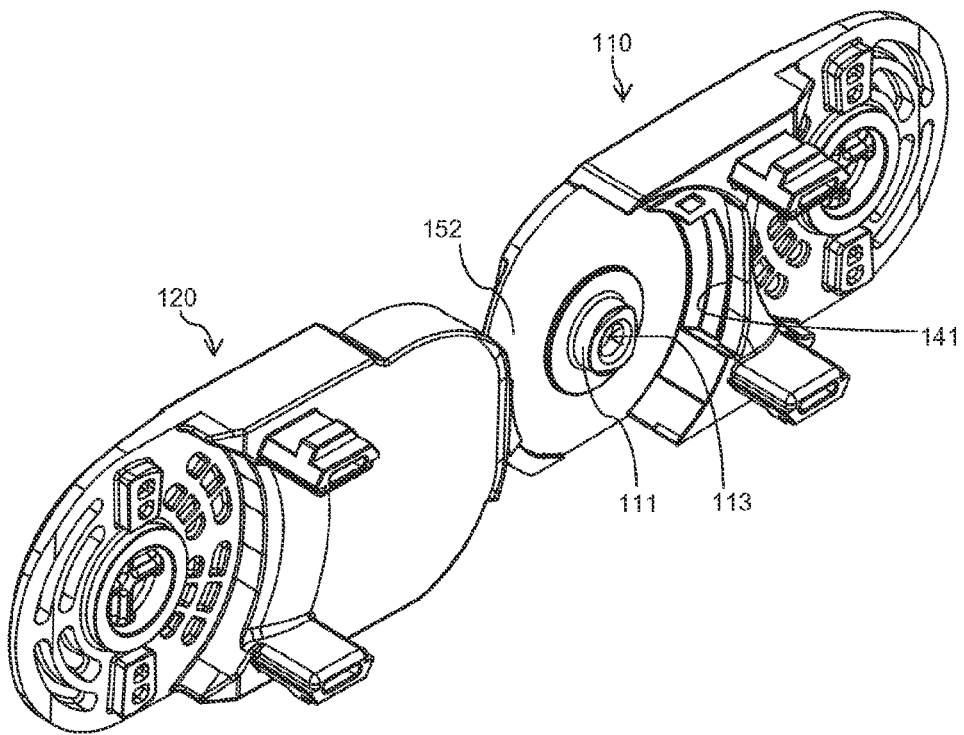

FIGS. 10A-10B illustrate an independent second aspect of the invention, in which a roller 20 according to the first aspect can optionally be used.

In FIGS. 10A-10B a pair of interacting, adjacent outer link plates 110, 120 is shown, which are connected swivellably to one another. On the first outer link plate 110 there is formed in one piece with this a laterally projecting, substantially cylindrical joint pin 111. This acts to form a swivel joint together with a corresponding joint mount 121 on the second outer link plate 120 to form the swivellable flexible connection between the two lateral link plates 110, 120. This joint mount 121 of the second outer link plate 120 is formed by a sleeve-like annular projection 122 coaxial with the swivel axis, which projection is manufactured in one piece with the second outer link plate 120. In the assembled state, not shown here, the joint pin 111 is thus supported rotatably in the joint mount 121, so that the outer link plates 110, 120 are swivellable relative to one another. To further reinforce the swivellable flexible connection, the second outer link plate 120 has a coaxial centering pin 123, which engages swivellably in a cylindrical opening 113 in the joint pin 111.

The roller 20 is attached rotatably by means of a bearing unit 130, here a ball bearing, to a first and a second bearing ring 131, 132 on the annular projection 122 of the second outer link plate 120. To this end the hub is attached in a torque-proof manner, e.g. by force or form fit, on the first ring 131 and the second ring 132 is attached in a torque-proof manner on the annular projection 122, e.g. by a press fit or similar.

The first outer link plate 110 has a first guide groove 141 extending parallel to the swivel plane, in which groove the second outer link plate 120 of the pair engages with a first guide part 151 extending parallel to the swivel plane, in particular over the entire swivel angle. The second outer link plate 120 forms by means of a cover part 160 to be attached separately, e.g. by screw connection, a second guide groove 142 extending parallel to the swivel plane. The first outer link plate 110 has another, second guide part 152 extending parallel to the swivel plane, which part engages in the second guide groove, in particular over the entire swivel angle, in order to increase the lateral stability.

Th rotary axis R of the roller 20 and bearing unit 130 is fixed here with reference to both lateral link plates 110; 120, namely here coaxial with the swivel axis, which is predefined by joint pin 111 and joint mount 121 etc.

Energy Chain Comprising Rollers

REFERENCE CHARACTER LIST

FIG. 1-2
1 Energy chain
2 Chain link
3, 4 Upper strand and lower strand
5 Deflection area
20 Rollers
21 Hub
22 Rim
23 Radial region
24 Tapering or narrowing
25 Face
26 Receptacle (for pivot bearing unit)
26A Attachment profile
26B Projections/recesses
29 Running surface
R Rotary axis
R1, R2, R3 Radii
T1 T2 Axial wall thickness
FIG. 3-6
30, 40, 50, 60 Rollers
33, 43 Radial region
49 Running surface
37A, 37B; 47; 57A, 57B; 67 Axial apertures
38A, 38B; 48; 58; 68 Radial webs
FIG. 7-9
72; 82; 92 Rim
79; 89; 99 Running surface or rolling profile
99A, 99B Crest and trough
FIG. 10A-10B
110; 120 Outer link plates
111 Joint pin
113 (Centering) opening
121 Joint mount
122 Annular projection
123 Centering pin
130 Bearing unit (with ball bearing)
131, 132 Bearing rings
141 First guide groove
142 Second guide groove
151 First guide part
152 Second guide part
160 Cover part (as transverse securing part)

What is claimed is:

1. An energy chain to guide at least one line, comprising:
 a plurality of chain links flexibly connected to each other, which each comprise lateral link plates parallel to one another and cross webs connecting the lateral link plates,
 wherein the energy chain is displaceable such that the plurality of chain links forms opposite strands as upper and lower strands, and a deflection area connecting the upper strand and the lower strand,
 wherein, to facilitate a rolling action when the energy chain is displaced, rollers are provided on at least some of the plurality of chain links of the upper strand and/or the lower strand, which project beyond narrow sides of the lateral link plates in a direction of the respectively opposite strand,
 wherein each of the rollers comprise a wheel body made of plastic with a hub, a rim and a radial region connecting the hub and the rim, wherein a material thickness of the radial region is reduced compared with the rim such that radial impacts during the rolling action are dampable by elastic deformability of the radial region.

2. The energy chain according to claim 1, wherein the wheel body with hub, rim and radial region of each roller is a one piece plastic body.

3. The energy chain according to claim 2, wherein the one piece plastic body is an injection molded one piece plastic body and/or the one piece plastic body is formed of a thermoplastic elastomer.

4. The energy chain according to claim 1 wherein the wheel body is formed of a thermoplastic elastomer which comprises a thermoplastic polyurethane.

5. The energy chain according to claim 1, wherein the rim comprises an outer rolling surface to roll on a running surface and the hub comprises a bearing receptacle coaxial with a rotary axis of the roller.

6. The energy chain according to claim 5, wherein the roller is attached by the bearing receptacle of the hub in a torque-proof manner to a pivot bearing unit, by which the roller is supported rotatably on a lateral link plate of the lateral link plates.

7. The energy chain according to claim 6, wherein the hub comprises on an inner surface an attachment profile with projections and/or recesses, for a force-fit and a form-fit connection to an outer surface of the pivot bearing unit.

8. The energy chain according to claim 5, wherein the running surface has a rolling profile that, in cross section, forms at least one concave recess and/or at least one convex bulge.

9. The energy chain according to claim 5, wherein the running surface has a rolling profile that is undulated in a circumferential direction with alternating crests and troughs.

10. The energy chain according to claim 9, wherein the alternating crests and troughs are directed obliquely to a meridian plane.

11. The energy chain according to claim 10, wherein two rotationally symmetrical profile halves are offset asymmetrically with respect to the meridian plane.

12. The energy chain according to claim 1, wherein each of the rollers has opposite sides, and wherein the radial region comprises at least one axial taper on each side of the opposite sides, respectively.

13. The energy chain according to claim 12, wherein the radial region has an axial thickness of 33% to 60% of an axial thickness of the rim.

14. The energy chain according to claim 12, wherein the radial region has a minimal axial thickness in a range of 25% to 40% of the axial thickness of the rim.

15. The energy chain according to claim 1, wherein the radial region has, with an increasing radius of the wheel body, an axial thickness continuously decreasing down to a minimum and then continuously increasing axial thickness.

16. The energy chain according to claim 15, wherein the radial region has a face on each of the opposite sides of the roller, and wherein each face is concavely curved according to a radius of curvature.

17. The energy chain according to claim 16, wherein the radius of curvature is greater than a maximal axial thickness of each roller.

18. The energy chain according to claim 16, wherein a continuously curved transition is provided from each face of the radial region to an inner surface of the rim and/or to an outer surface of the hub, wherein the curved transition has a transition radius which is smaller than the radius of curvature.

19. The energy chain according to claim 1, wherein the radial region extends in a radial direction over a proportion of at least 25% of a radial dimension of the wheel body.

20. The energy chain according to claim 1, wherein the radial region is formed as a rotationally symmetrical ring disc that is contiguous in a circumferential direction.

21. The energy chain according to claim 1, wherein the radial region comprises axial apertures arranged rotationally symmetrically in a circumferential direction, which form spoke-like radial webs in the radial region.

22. The energy chain according to claim 1, wherein each of the rollers is supported rotatably on the lateral link plates with a rotary axis held stationary in relation to the lateral link plates.

23. The energy chain according to claim 1, wherein the roller is supported by a pivot bearing unit, which is mounted on a swivel joint, which is formed by two adjacent lateral link plates and flexibly connects the two adjacent lateral link plates swivelably to one another, wherein the lateral link plates each have a corresponding recess, in which the roller is received between overlapping side wall areas of the lateral link plates.

24. The energy chain according to claim 1, wherein the upper strand is rollable on the lower strand and running surfaces for the rollers are formed by the narrow sides of the lateral link plates facing the opposite strand.

25. An energy chain to guide at least one line, comprising:
two link plate strands comprising alternating inner link plates and outer link plates, which are connected swivelably to each other by flexible connections,
wherein at least some of the outer link plates have cross webs holding the outer link plates respectively parallel to one another,
wherein the energy chain is displaceable such that the energy chain forms opposite strands as upper and lower strands, and a deflection area connecting the upper strand and the lower strand,
wherein, to facilitate a rolling action when the energy chain is displaced, at least the upper strand and/or the lower strand comprises a plurality of rollers, which project beyond narrow sides of the inner and outer link plates in a direction of the respectively opposite strand,
wherein each roller is arranged respectively on a pair of outer link plates of the outer link plates, comprising a first outer link plate and an adjacent second outer link plate, swivelable in relation to one another, and the flexible connection of the pair of outer link plates comprises a joint pin, which is formed in one piece with the first outer link plate, and a corresponding joint mount, which is formed by the second outer link plate, wherein the joint pin engages in the joint mount and is swivelable therein,
wherein the second outer link plate has a sleeve-like annular projection coaxial with a swivel axis, wherein the sleeve-like annular projection forms the joint mount, on which each roller is supported rotatably with a rotary axis of the roller coaxial with the swivel axis.

26. The energy chain according to claim 25, wherein each roller is mounted in a torque-proof manner on a first ring of a pivot bearing unit, which is attached by a relatively rotatable second ring in a torque-proof manner on an outer circumference of the sleeve- like annular projection of the second outer link plate by press fitting.

27. The energy chain according to claim 25, wherein the energy chain has a uniform spacing and a position of a swivel axis of the pair of outer link plates corresponds in a longitudinal direction to the spacing and is offset in height with reference to a link plate height with respect to a central plane in a direction of the respectively opposite strand.

28. The energy chain according to claim 25, wherein one outer link plate of the pair of link plates has a first guide groove extending parallel to the swivel axis,
wherein the other outer link plate of the pair of link plates engages in the first guide groove with a first guide part extending parallel to the swivel axis over the entire swivel angle,
wherein the other outer link plate of the pair of link plates has a second guide groove extending parallel to a swivel plane, and
wherein the one outer link plate of the pair of link plates engages in the second guide groove with a second guide part extending parallel to the swivel plane over the entire swivel angle.

29. The energy chain according to claim 25, wherein one of the outer link plates of the pair of link plates comprises a cover part which is appliable separately and which forms a lateral delimitation of a guide groove.

30. A roller assembly of an energy chain, comprising:
a pair of lateral link plates, which are flexibly connected to one another and each comprise two narrow sides, and
a roller arranged on the pair of lateral link plates, which is arranged such that the roller projects beyond a narrow side of the lateral link plates, to facilitate a rolling action when the energy chain is displaced,
wherein the roller comprises a wheel body made of plastic with a hub, a rim and a radial region connecting the hub and the rim, wherein a material thickness of the radial region is reduced compared with the rim such that radial impacts during the rolling action are dampable by elastic deformability of the radial region.

* * * * *